US008412754B2

(12) United States Patent
Chen et al.

(10) Patent No.: US 8,412,754 B2
(45) Date of Patent: Apr. 2, 2013

(54) VIRTUAL SYSTEM ADMINISTRATION ENVIRONMENT FOR NON-ROOT USER

(75) Inventors: Ruzhu Chen, Poughkeepsie, NY (US); Yinhe Cheng, Austin, TX (US); Tzy-Hwa Kathy Tzeng, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/764,656

(22) Filed: Apr. 21, 2010

(65) Prior Publication Data
US 2011/0264718 A1    Oct. 27, 2011

(51) Int. Cl.
*G06F 17/30*    (2006.01)
(52) U.S. Cl. ...................................................... 707/831
(58) Field of Classification Search .................. 707/831
See application file for complete search history.

(56) References Cited

U.S. PATENT DOCUMENTS

| | | | |
|---|---|---|---|
| 6,356,915 B1 * | 3/2002 | Chtchetkine et al. ......... | 707/823 |
| 6,408,298 B1 * | 6/2002 | Van et al. ................. | 707/999.01 |
| 6,795,855 B2 | 9/2004 | Bonilla et al. | |
| 6,993,589 B1 * | 1/2006 | Blumenau et al. ............. | 709/229 |
| 7,093,125 B2 | 8/2006 | Robb et al. | |
| 7,219,354 B1 | 5/2007 | Huang et al. | |
| 7,290,260 B2 | 10/2007 | Miller | |
| 7,567,985 B1 * | 7/2009 | Comay et al. .......... | 707/999.001 |
| 7,610,304 B2 * | 10/2009 | Jain et al. ............... | 707/999.001 |
| 7,805,409 B2 * | 9/2010 | Manczak et al. .............. | 707/638 |
| 8,239,403 B2 * | 8/2012 | Anumula et al. ............. | 707/769 |
| 8,271,557 B1 * | 9/2012 | Lysaght et al. ................ | 707/822 |
| 8,301,673 B2 * | 10/2012 | Hyer et al. .................... | 707/822 |
| 2003/0135611 A1 | 7/2003 | Kemp et al. | |
| 2004/0122946 A1 | 6/2004 | Hu et al. | |
| 2005/0010812 A1 * | 1/2005 | Terrell et al. .................. | 713/201 |
| 2005/0210461 A1 * | 9/2005 | Srivastava et al. ............ | 717/170 |
| 2006/0041575 A1 * | 2/2006 | Sciarra .......................... | 707/101 |
| 2007/0050681 A1 | 3/2007 | DeRobertis et al. | |
| 2007/0134069 A1 * | 6/2007 | Smith et al. ..................... | 406/39 |
| 2007/0136723 A1 * | 6/2007 | Smith et al. ....................... | 718/1 |
| 2007/0271317 A1 * | 11/2007 | Carmel .......................... | 707/204 |
| 2008/0178285 A1 | 7/2008 | Perlman et al. | |

(Continued)

OTHER PUBLICATIONS

Okumura et al., "Network I/O Extensibility Without Administrator Privilege", Fifth International Conference on, Apr. 20-25, 2009, pp. 168-173.

(Continued)

*Primary Examiner* — Rehana Perveen
*Assistant Examiner* — Tiffany Thuy Bui
(74) *Attorney, Agent, or Firm* — Walter W. Duft (57) ABSTRACT

A virtual system environment in a computing system allows non-root users to perform administrative operations normally requiring root privileges. A virtual control module has a virtual file system with virtual directories corresponding to one or more of the system directories of a root file system. Each virtual directory contains one or more symbolic links symbolically linking to one or more system files as link targets. The symbolic links have non-root permissions that allow the non-root users to perform administrative operations in the virtual control module that delete, change or replace the symbolic links. A capability is provided to resolve the symbolic links within the virtual control module to allow the non-root users to execute the link targets via the symbolic links. One or more non-root users may be placed in the virtual control module by setting their apparent root directory to a root directory of the virtual file system.

14 Claims, 5 Drawing Sheets

U.S. PATENT DOCUMENTS

| | | | |
|---|---|---|---|
| 2008/0195964 | A1 | 8/2008 | Randell |
| 2009/0182778 | A1 | 7/2009 | Tormasov |
| 2009/0210541 | A1 | 8/2009 | Chandolu et al. |
| 2009/0307444 | A1 | 12/2009 | Cyr et al. |
| 2010/0154026 | A1* | 6/2010 | Chatterjee et al. ............ 726/1 |
| 2011/0264716 | A1* | 10/2011 | Kuwahara et al. ............ 707/827 |

OTHER PUBLICATIONS

Xu et al., "Privilege Delegation and Agent-Oriented Access Control in Naplet", Proceedings, 23rd International Conference on, May 19-22, 2003, pp. 493-497.

G. Brunette, "Restricting Service Adminstration in the Solaris(TM) 10 Operating System", Sun BluePrints(TM) Online, Jun. 2005.

K. Milberg, "Workload Partitioning (WPAR) in AIX 6.1, WPAR systems administration and configuration", Apr. 8, 2008, pp. 1-18.

Simes, "How to break out of a chroot( ) jail", May 12, 2002, pp. 1-8.

T. J. White et al., "chroot login HOWTO", Aug. 19, 2001, pp. 1-2.

S. Soltesz et al., "Container-based Operating System Virtualization: A Scalable, High Performance Alterantive to Hypervisors", Jun. 2007, pp. 1-14.

S. Brandon et al., "Workload Partition Management in IBM AIX Version 6.1", Dec. 2008, pp. 1-356.

R. Whitworth, "Symlinks and chroot( )", Proftpd: A User's Guide, 2001, pp. 1-3.

IBM Corporation, "IBM Workload Partitions for AIX", Nov. 2007, pp. 1-44.

* cited by examiner

VIRTUAL SYSTEM ADMINISTRATION ENVIRONMENT FOR NON-ROOT USER

BACKGROUND

1. Field of the Invention

The present invention relates to computer systems used for general or special purpose computing. More particularly, the invention concerns the administration of computer software environments utilized computer system users.

2. Description of the Prior Art

By way of background, many computer systems provide different levels of access to system users based on user privilege levels. Typically, there is at least one root user and one or more non-root users. The root user is a system administrator with administrative privileges to perform functions such as the installation of system software/patches, the configuration of system and network environment settings, etc. Non-root users normally do not have such privileges and therefore must rely on the system administrator make administrative-level configuration changes. In busy enterprises, requiring a user to communicate with a system administrator and possibly lobby or negotiate for a desired configuration change can be very disruptive. In some cases the configuration change might not be permitted because it is unsuitable for the other users. On the other hand, granting non-root users the right to perform system administration functions could compromise system stability and security.

SUMMARY

A virtual system administration environment in a computing system allows non-root users to perform system administration operations that normally require root privileges. The computing system may include an instruction processor, a memory and a data storage operatively coupled together. The data storage may include one or more storage media tangibly embodying a hierarchical root file system containing plural system files in one or more system directories for supporting data processing operations on behalf of users of the computing system. The memory may include a storage medium tangibly embodying a program of instructions executable by the processor to perform operations for establishing the virtual system administration environment. These operations may include:

providing a virtual control module having a virtual file system that includes one or more virtual directories corresponding in name to one or more of the system directories of the root file system, each of the virtual directories containing one or more symbolic links corresponding in name and symbolically linking to one or more of the system files representing symbolic link targets;

the symbolic links having non-root permissions that allow non-root users to perform administrative operations in the virtual control module that delete or change the symbolic links, or replace them with system files that are not symbolic links;

providing a capability to resolve the symbolic links from within the virtual control module to allow non-root users to execute the one or more system files by invoking the symbolic links of the same name; and placing one or more of the non-root users in the virtual control module by setting a root directory of the virtual file system as an apparent root directory of the one or more non-root users.

BRIEF DESCRIPTION OF THE DRAWINGS

The foregoing and other features of the disclosed subject matter will be apparent from the following more particular description of example embodiments, as illustrated in the accompanying Drawings, in which.

DETAILED DESCRIPTION OF EXAMPLE EMBODIMENT

Figure 1:
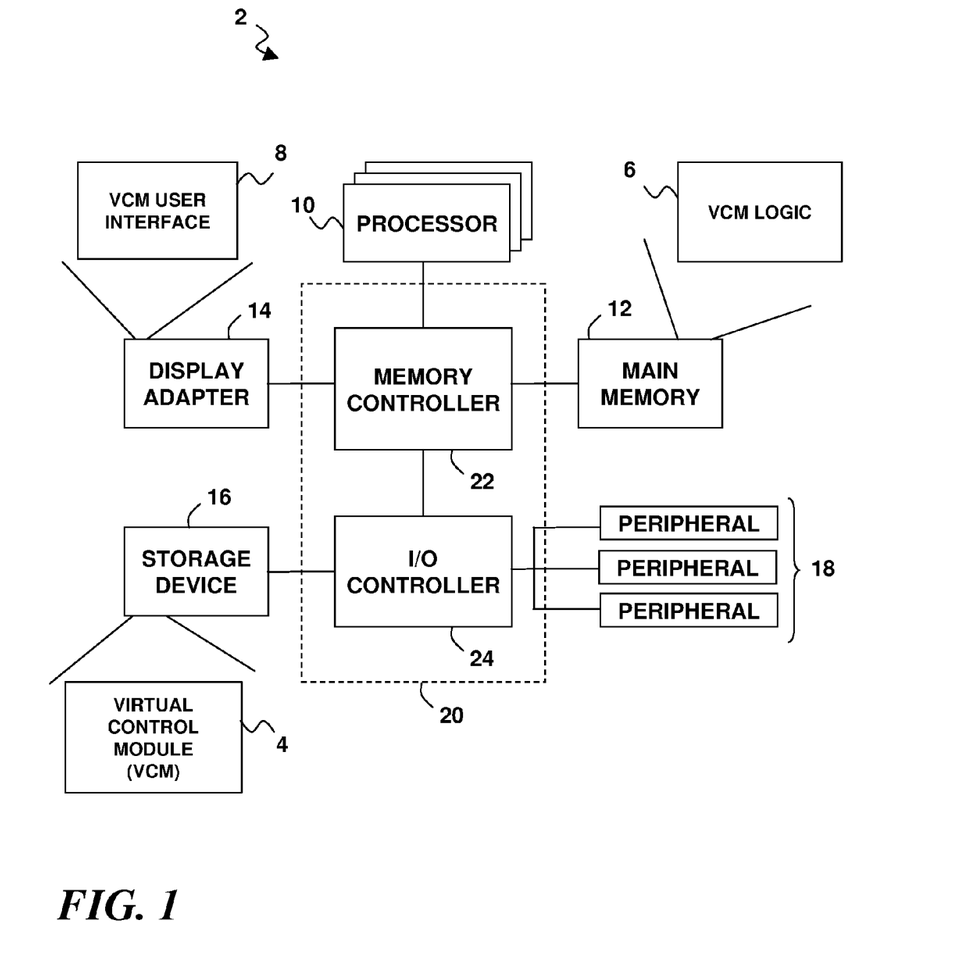
FIG. 1 is a functional block diagram showing an example computing system that may be used to implement a virtual system administration environment as disclosed herein.

Turning now to the drawing figures, wherein like reference numerals represent like elements in all of the several views, FIG. 1 illustrates a computing system 2 for supporting the establishment and operation of a virtual system administration environment. As indicated by way of summary above, such an environment allows non-root users of the system 2 to perform system administration operations that normally require root privileges, without affecting other users. The virtual system administration environment of FIG. 1 utilizes a virtual control module (VCM) 4 that may be built and managed using VCM logic 6. A VCM user interface 8 may be optionally provided to allow a system administrator to interact with the VCM logic 6. Non-root user interaction with the VCM logic 6 may also be supported for certain operations (as described in more detail below).

The system 2 may comprise any of various types of computational machine apparatus, including but not limited to a general purpose computer, a special purpose computer, or an apparatus that is not necessarily a computer but which performs data processing operations (such as a communications device, a multimedia device, or any other type of programmed or logic-implementing device). The system 2 includes one or more instruction processors 10 that operate in conjunction with a main memory 12 that may be used to store program instructions executed by the processor(s). Although not shown, cache memory may be respectively disposed between the processor(s) 10 and the main memory 12 to assist in program execution. As used herein, the term "processor(s)" includes, but is not necessarily limited to, single-threaded or multi-threaded CPUs (Central Processing Units) within single-core or multi-core processor devices (each core being considered a CPU) that are designed to execute program instruction logic, such as software or firmware. The memory 16 may comprise RAM (Random Access Memory), ROM (Read-Only Memory), combinations of RAM and ROM, or any other type of tangible storage medium capable of storing data in computer readable form. The processor(s) 10 and the memory 12 may be situated within a single computing node (e.g., as part of a single-node SMP system) or they may be distributed over plural nodes (e.g., as part of a NUMA system or cluster).

Additional components of the system 2 may include a display adapter 14 for generating visual output information (e.g., text and/or graphics) to a display device (not shown), a persistent data storage device 16 (e.g., a disk drive) having one or more storage media (e.g., disks), and various peripheral devices 18 that may include a keyboard input device, a pointer input device, a network interface card (NIC), a USB bus controller, a SCSI disk controller, etc. A bus infrastructure 20, which may include a memory controller hub or chip 22 (e.g., a northbridge) and an I/O (input/output) controller hub or chip 24 (e.g., a southbridge), may be used to interconnect the foregoing elements. It should be understood that the foregoing description is for purposes of illustration only, and that other components and arrangements may also be used to implement the internals of the system 2.

The virtual control module 4 is shown in FIG. 1 as being maintained on the data storage device 16. Other types of data storage, including but not limited to directly attached storage, network storage, removable media, etc., could also be used. As described in more detail below, the virtual control module 4 comprises a virtual file system that supports system administration operations by non-root users. As used herein, a non-root user refers to a user that does not have administrative privileges and is not normally permitted to perform system administration operations that change system files. System files are files that usually have restricted access permissions. These may include binaries, libraries and the like that are provided for use by all system users. In contrast a non-root user, a root user (a.k.a. superuser) is a system administrator that has such administrative privileges.

The VCM logic 6 may be implemented as software, firmware, hardware or any combination thereof. If implemented as software, the VCM logic 6 can be permanently stored on the storage device 16 (or in any other operatively connected storage) and loaded during system operation into a portion of the main memory 12 that comprises RAM. If implemented as firmware, the logic 4 could reside in a portion of the main memory 12 that comprises ROM. In either implementation, the VCM logic 6 may be implemented as a program of instructions that is tangibly embodied in the main memory 12 during system operation. The program of instructions may be executed by the processor(s) 10 to perform operations such as establishing the virtual control module 4, placing one or more non-root users therein, and to support other functions that will be described in more detail below. As indicated above, the VCM logic 4 may also be implemented in whole or in part using dedicated logic hardware that performs the required operations.

The VCM user interface part 8 can be implemented by the VCM logic 6 using the display adapter 14 in association with a monitor or other display device for information output, together with one or more of the peripheral devices 18 for control and/or data input (e.g., a keyboard, a mouse, etc.). The VCM user interface part 8 may operate as a text-based interface, a graphical user interface, or in any other suitable manner to support interaction with the VCM logic 6.

Figure 2:
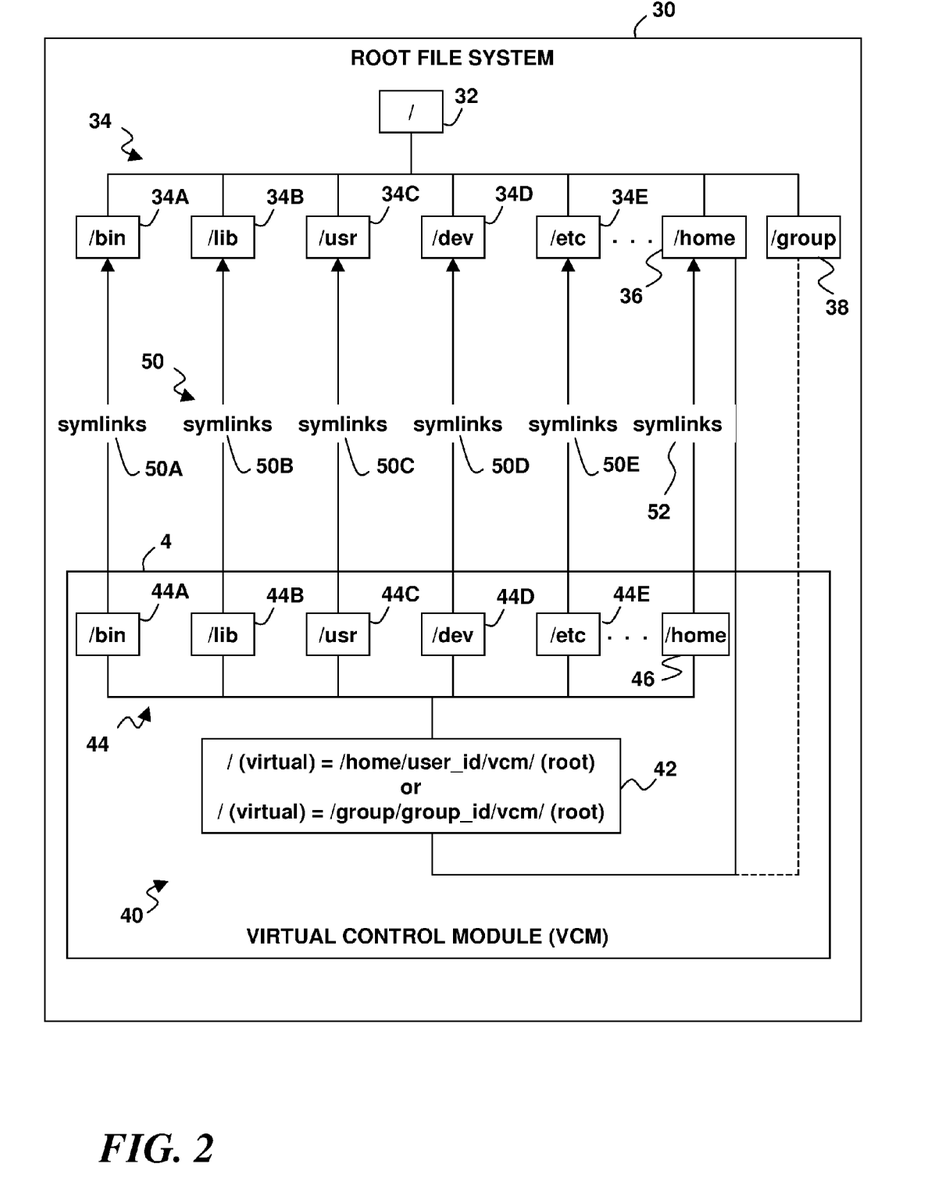
FIG. 2 is a functional block diagram showing a root file system and an example virtual control module having a virtual file system.

With additional reference now to FIG. 2, the storage device 16 supports a hierarchical root file system 30 that may be tangibly embodied on one or more storage device media. The root file system 30 includes a top-level root directory 32 and one or more subordinate system directories 34 containing plural system files (not shown in FIG. 2). The root directory 32 is identified by the forward slash character "/" in accordance with conventional practice for Unix-like operating systems. However, it is to be understood that the virtual system administration environment 4 is not limited to such operating systems and may be implemented in other operating systems, including systems in which the root directory is designated by a drive letter followed by a colon and a backward slash character (e.g., "C:\").

The system directories 34 below the root directory 32 may include any number of standard directories. These may include, but are not limited to, a binaries ("/bin") directory 34A containing system binary files, a libraries ("/lib") directory 34B containing system library files, a user ("/usr") directory 34C containing system user binaries, a device ("/dev") directory 34D containing device files, and a configuration ("/etc") directory 34E containing password files, group and user definition files, program configuration files, shell script files and various other files for configuring the software environment of the system 10. Although not shown, each of these standard directories may contain subdirectories containing particular categories of system files. The root file system 30 may additionally include a home ("/home") directory 36 that contains a subdirectory for each non-root user of the system 2. Optionally, the root file system 30 may additionally include a group directory (e.g., "/group") 38 that may contain files associated with a designated group of non-root users of the system 2.

FIG. 2 further illustrates the virtual control module 4 of FIG. 1. As shown, the virtual control module 4 may comprise a virtual file system 40 that includes a top-level virtual root directory 42 and one or more subordinate virtual system directories 44 below the virtual root directory 42. So as to avoid confusion, the reader should note that the virtual file system 40 is shown as inverted in FIG. 2 for convenience. As such, the virtual root directory 42 representing the root of the virtual file system hierarchy happens to be located beneath the virtual system directories 44 even though these directories are subdirectories of the virtual root directory and thus subordinate thereto. In contrast, FIG. 4 (described in more detail below) shows the virtual file system 40 in a non-inverted orientation.

Although the virtual root directory 42 is a top-level directory of the virtual file system 40, it is also a subdirectory of the root file system 30 and may be inserted at any convenient location in the root file system hierarchy. For example, if the virtual control module 4 is for use by a single non-root user called "user_id", the virtual root directory 42 of the virtual file system 40 could be implemented as a directory called "vcm" in the user's home directory. This example placement is illustrated by the solid line extending from the home ("/home") directory 36 of the root file system to the virtual root directory 42 of the virtual file system 40. As shown in FIG. 2, the root file system pathname of the virtual root directory 42 might then be "/home/user_id/vcm/" or the like. Similarly, if the virtual control module 40 is to be shared by a group of non-root users called "group_id", the virtual root directory 42 of the virtual file system 40 could be implemented as a directory called "vcm" in that group's group directory. This example placement is illustrated by the dashed line extending from the group ("/group") directory 36 of the root file system to the virtual root directory 42 of the virtual file system 40. As shown in FIG. 2, the root file system pathname of the virtual root directory 42 might then be "/group/group_id/vcm/" or the like.

The virtual system directories 44 of the virtual file system 42 are provided as virtual counterparts to one or more of the system directories 34, with the number of virtual directories being determined according to operational requirements or preferences. Each virtual system directory 44 that is provided in the virtual file system 40 will correspond in name to its counterpart system directory 34 in the root file system 30. In FIG. 2, there are five virtual system directories 44A-44E corresponding to the system directories 34A-34E described above. In particular, the virtual system directories 44 include a virtual binaries ("/bin") directory 44A, a virtual libraries ("/lib") directory 44B, a virtual user ("/usr") directory 44C, a virtual device ("/dev") directory 44D, and a virtual configuration ("/etc") directory 44E. FIG. 2 also shows a virtual home ("/home") directory 46 as a further option. Although not shown, a virtual group ("/group") directory could also be provided.

Figure 3:
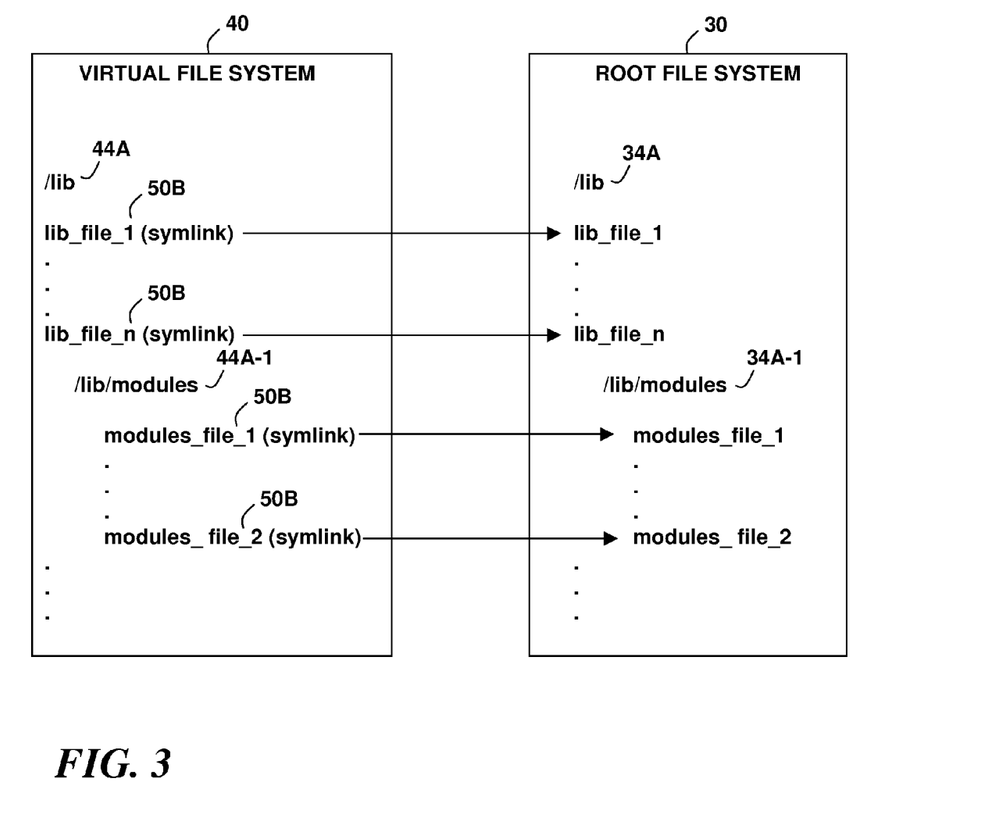
FIG. 3 is a functional block diagram showing example symbolic links for establishing an example virtual control module.

Each virtual directory 44 and 46 may be populated with one or more subdirectories that correspond in name to counterpart subdirectories within the directories 34 and 36. This is depicted in FIG. 3, which shows an example implementation of the virtual libraries ("/lib") directory 44A in the virtual file system 40 and its counterpart system libraries ("/lib") directory 34A in the root file system 30. As can be seen, the virtual libraries directory 44A includes a virtual modules ("/lib/modules") subdirectory 44A-1 that corresponds to a modules ("/lib/modules") subdirectory 34A-1 of the root file system 30.

For reasons which will be made clear below, the virtual root directory 42 of FIG. 2 will appear under a standard root directory designation (such as "/") for any user that has been placed in the virtual control module 40. Moreover, the designations ("/bin", "/lib", "/usr", "/dev" and "/etc" used for the virtual directories 44A-44E are the directory designations that users will encounter within the virtual control module 40. The same is true for the "/home" designation used for the virtual home directory 46. These designations may be referred to as the virtual pathnames. In contrast, when considered in the context of the root file system 30, the virtual directories 44A-44E and 46 will have non-virtual pathnames that begin with the root directory 32. Table I shows the virtual/non-virtual pathname correspondence based on the virtual file system being rooted in the directory "/home/user_id/vcm/" of the root file system 30.

TABLE I

| Virtual (VCM) Pathname | Non-Virtual (Root) Pathname |
| --- | --- |
| / | /home/user_id/vcm/ |
| /bin | /home/user_id/bin/ |
| /lib | /home/user_id/lib/ |
| /usr | /home/user_id/usr/ |
| /dev | /home/user_id/dev/ |
| /etc | /home/user_id/etc/ |
| /home | /home/user_id/home/ |

Each of the virtual system directories 44A-44E, together with one or more subdirectories thereof, can be mapped to their counterpart system directories 34A-34E by populating them with symbolic links 50. These symbolic links are referred to as "symlinks" in FIG. 2. They are sometimes also referred to as soft links All of the symbolic links 50 for the files within each virtual directory 44A-44E of FIG. 2 are collectively identified by reference numerals 50A-50E. Symbolic links 52 may likewise be provided for files within the virtual home directory 46. Each of the symbolic links 50 and 52 corresponds in name to an individual file within one of the root file system directories 34 or 36, or a subdirectory thereof. These individual files represent link targets of the symbolic links 50 and 52. This is depicted in FIG. 3, which shows several example symbolic links 50B that may be created in the virtual libraries ("/lib") directory 44A and its "/lib/modules" subdirectory 44A-1 in the virtual file system 40. The symbolic links 50B correspond in name, and are symbolically linked, to corresponding system library files in the system libraries ("/lib") directory 34B and its "/lib/modules" subdirectory 34A-1 of the root file system 30.

As is conventionally known, a symbolic link represents a file whose file contents comprise the pathname of the link target. A symbolic link (a.k.a. "soft link") is distinct from another type of link known as a "hard link." A hard link is not a separate file but rather a distinct filename given to an existing file. For example, in a Unix-like operating system each file is associated with an inode data structure that stores information about the file. A hard link and its link target share the same inode, but use different names for the associated file. A recognized disadvantage of hard links in Unix-like operating systems is that they must exist within the same partition of the same storage device as their link targets.

In FIG. 2, all of the directories 42, 44 and 46 of the virtual file system 40, as well as each of the symbolic links 50 and 52, may be created with non-root file permissions. More particularly, the file permissions may be set so that any non-root user placed within the virtual control module 40 will have the ability to act as a system administrator within the virtual administration environment. This means that the non-root user will be able to delete and modify the directories and symbolic links, or replace them as needed, such as during the installation of new software or software updates. Note that symbolic links will typically not be replaced with new symbolic links. Rather, when the non-root user installs new software or performs a software update, the software installation or update program will replace symbolic links with actual system files of the same name. For example, if the symbolic link referred to as "lib_file_1" in FIG. 3 happens to be replaced as part of a software update, the link will be replaced with an updated version of the link target, namely, the system file named "lib_file_1" in the root file system 30. Note that the replacement files will typically have non-root user file permissions if they are installed with non-root user privileges. This means that they can be deleted, edited or replaced in the event of a subsequent software installation or update. It will be further appreciated that no software changes within the virtual control module 4 will change any files located outside of the virtual control module in the root file system directories 34 and 36. Thus, other users who have not been placed in the virtual control module 4 will be unaffected.

In order to complete the virtual system administration environment envisioned by the present disclosure, one or more non-root users may be placed in the virtual control module 4. This can be done by changing the root directory associated with non-root user processes to be the virtual file system root directory 42. Changing the root directory may require modifying one or more data structures used by the underlying operating system to represent such processes. One existing program that performs such modifications is the "chroot" shell command found in most, if not all, Unix-like operating systems. The chroot command has the form "chroot /some_directory" where "/some_directory" represents the new root directory. Execution of the chroot command results in the newly assigned root directory being the apparent system root directory ("/") for the process in which chroot was called. By way of example, a non-root user may be placed in the virtual control module 4 of FIG. 2 by calling the chroot command with the new root directory being specified using a directory name such as "/home/user_id/vcm/" or "/group/group_id/vcm/".

One way that the chroot command may be implemented is to incorporate it into a non-root user's system login sequence. A typical login sequence authenticates the user, establishes the user's operational environment, and starts a user shell program (or the like) for command execution. This procedure may be modified so that the VCM logic 6 is invoked following normal user authentication to implement the chroot command to place the user in the virtual control module 4. The VCM logic 6 could then start the user's shell program. This aspect of the VCM logic 6 could be implemented as a VCM login script or other program that invokes the chroot command and thereafter invokes the user shell (or other top-level program). It should be noted that additional steps to temporarily elevate the user to superuser privileges may be needed insofar as the chroot command in most, if not all, Unix-like operating systems requires root privileges for security reasons. However, the VCM logic 6 could reset the user to non-root privileges following the chroot operation and before completing the login procedure.

If a non-root user's login sequence is modified to place the user in the virtual control module 4 upon login, it may be desirable to add a login option that allows the user to specify whether or not they wish to enter a virtual system administration environment. The login part of the VCM logic 6 may be readily designed to support this option. In addition, it may be desirable to configure the VCM logic 6 so that is supports asynchronous requests from non-root users that are already logged in to have their operating environments dynamically changed to a virtual system administration environment. An escape option could also be provided so that non-root users can leave the virtual system administration environment. One way that this could be supported is by a second 'chroot' command that resets the user's apparent root directory to the root directory 32.

One issue that arises when placing a non-root user in the virtual control module 4 is the need to be able to resolve symbolic link pathname information. For example, conventional wisdom holds that it is not possible to symlink out of a chroot environment. This is due to the fact that the apparent system root directory ("I") is actually the chroot directory, e.g., "/home/user_id/vcm/" or "/group/group_id/vcm/". Thus, a symbolic link that points to a file in the system binaries ("/bin") directory 34A would be interpreted as pointing to the virtual binaries directory ("/bin") directory 44A. The problem is that within the virtual control module 4 a user process has no knowledge of any directory outside of the virtual file system 40.

Figure 4:
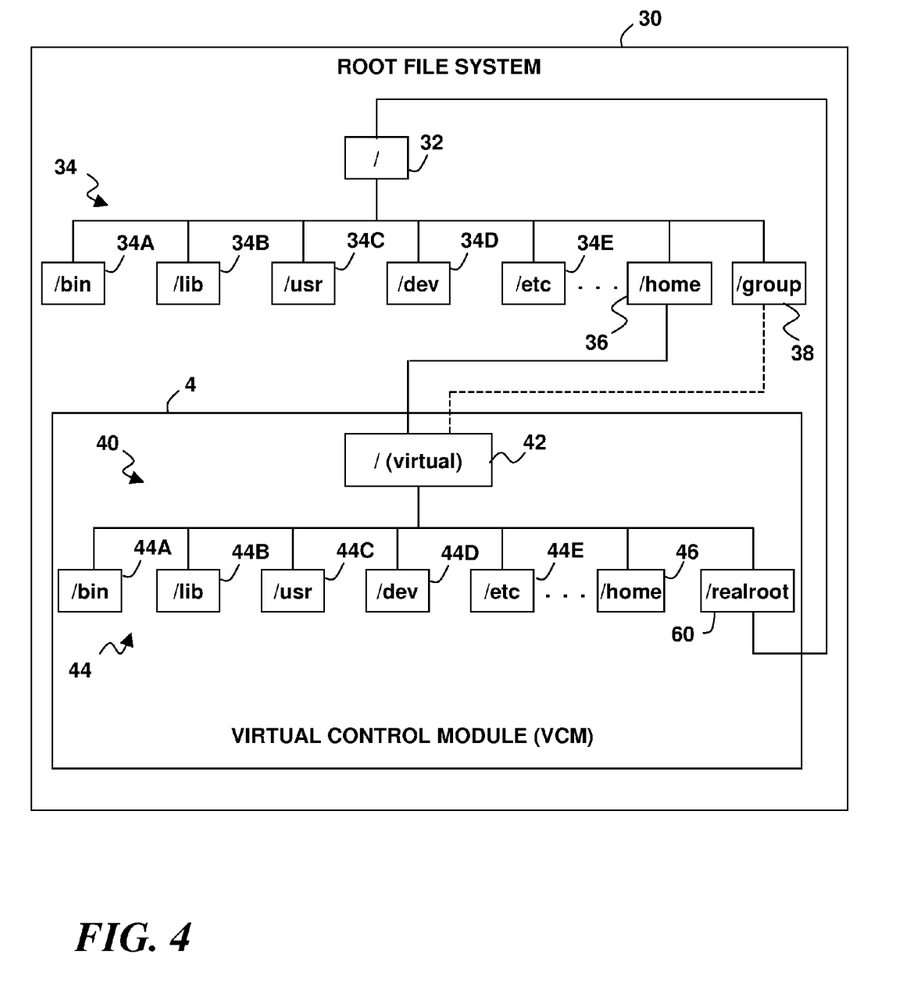
FIG. 4 is a functional block diagram showing an example arrangement for resolving symbolic links within a virtual control module.

One way that this dilemma may be resolved is to directly or indirectly mount the root directory 32 into the virtual file system 40 so that the symbolic link pathnames may be resolved within the virtual control module 4. This concept is illustrated in FIG. 4, which shows the root directory 32 being mounted into a virtual directory 60 referred to as "/realroot". Most, if not all, Unix-like operating systems allow a file system to be mounted at duplicate mount points. For example, in versions of the Linux® operating system, the root directory 32 (and thus the entire root file system 30) may be mounted into the virtual file system 40 by mounting the storage device that holds the root file system. For example, if the root file system 60 is on a device named /dev/sda1, the Linux® mount command:

'mount /dev/sda1 /home/user_id/vcm/realroot' would achieve this objective. An alternative would be to mount the file system 30 by specifying its pathname instead of its underlying device using a command such as:

'mount --bind/ /home/user_id/vcm/realroot' to invoke the --bind option of the Linux® mount command.

Following such mounting, the "/realroot" virtual file system directory 60 will have the system directories 34A-34E, as well as the home directory 36, mounted below it. The symbolic links 50 and 52 may be established either before or after the mount operation is performed. Establishing the symbolic links 50 and 52 after mounting is relatively straightforward. For example, a symbolic link 50A to the Unix "ls" command (used for listing directory contents) may be established in the virtual binaries "/bin" directory 44A, as follows:

ln -s /realroot/bin/ls /bin/ls, with the '-s' option of the 'ln' command specifying that the link is symbolic, the '/realroot/bin/ls' field representing the link target and '/bin/ls' representing the named symbolic link.

Establishing the symbolic links 50 and 52 before mounting requires care to ensure that the symbolic link pathways will be unchanged following the mount operation. One way that this can be done is to create a duplicate of the "/realroot" directory 60 in the root file system 30 as an immediate subdirectory of the root directory 32. The root directory 32 may then be mounted into the duplicate "/realroot" directory and the symbolic links 50 and 52 may be established per the symbolic link example given above. The root directory 32 may then be unmounted from the duplicate "/realroot" directory in the root file system 30 and remounted under the "/realroot" directory 60 in the virtual file system 40. Using this technique, the symbolic link pathnames will always start with "/realroot/ regardless of which "/realroot" directory is used as the mount point for the root directory 32.

The foregoing discussion addresses techniques for directly mounting the root directory 32 into the virtual file system 40. An indirect mounting technique may also be used. One way that this could be done is to mount a directory (not shown) into the virtual file system 40 that contains hard links to all of the desired files in the root file system directories 34A-34E and 36. Then the symbolic links 50 and 52 may be established to point to the hard links within the mounted directory.

As a final step in creation of the virtual control module 4, a file or other record may be established as the symbolic links 50 and 52 are being created. This file or record can be maintained on the storage device 16 (or any other operatively connected data storage). It may thereafter be used to reset the virtual control module 4 in the event that a non-root user wishes to undo system administration operations such as a new software installation or software update. A VCM reset command may be added to the VCM logic 6 as a shell script or other program that can be invoked by the non-root user within the virtual control module 4. The VCM reset operation may be performed in various ways. For example, the command could parse through the list of recorded symlinks in order to restore symlinks that have been deleted and delete new files that may have been added to replace such symlinks.

The VCM logic 6 may create a new virtual control module 4 whenever a virtual system administration environment is desired, such as when a new non-root user is added to the system 2. This part of the VCM logic 6 could be invoked in any suitable fashion. For example, a command for adding a new user to the system 2 could be modified to take a parameter value specifying that a new virtual control module 4 should be created for that user in the user's home ("/home") directory. If the new user is a member of a group of users, the command for adding the new user could take another parameter value specifying that a new virtual control module 4 should be created for the user group in a group ("/group") directory (assuming a group virtual control module does not already exist). The new user will then share the group virtual control module 4 with other group members.

Figure 5:
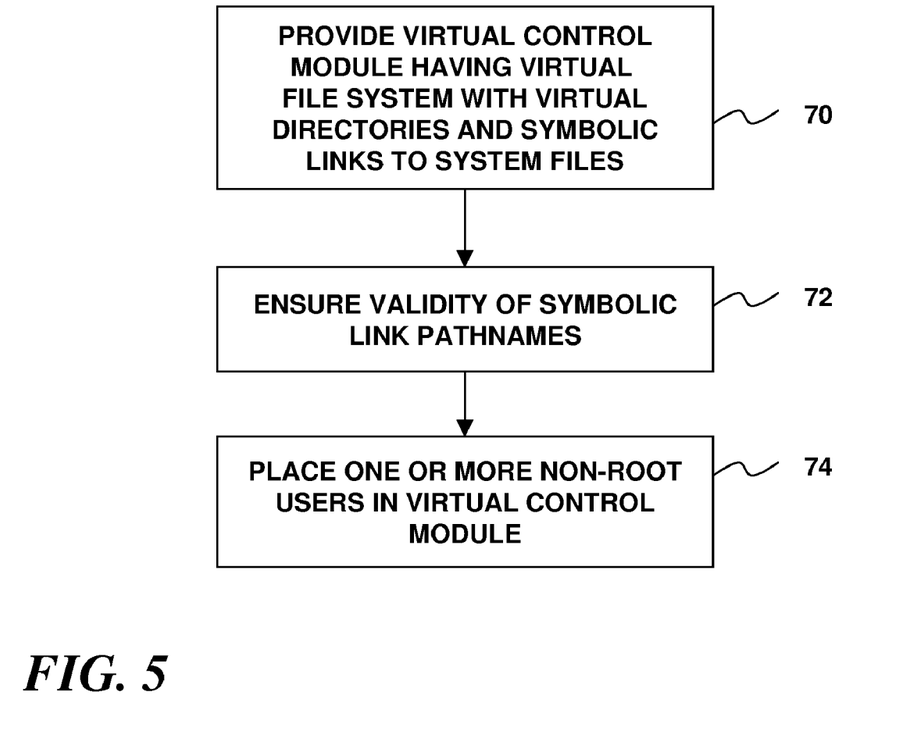
FIG. 5 is a flow diagram showing example operations for establishing a virtual system administration environment that includes a virtual control module.

Turning now to FIG. 5, an example flow diagram is shown to provide a generalized review of the previously described operations that may be performed to establish a virtual system administration environment in which one or more non-root users can perform system administration operations.

Block 70 illustrates the operation performed by the VCM logic 6 of providing a virtual control module having a virtual file system that includes one or more virtual directories corresponding in name to one or more of the system directories of the root file system, each of the virtual directories containing one or more symbolic links corresponding in name and symbolically linking to one or more of the system files representing symbolic link targets. As discussed above, this operation may be performed when a new user is created, or at any other appropriate time. An example virtual control module 4 has been shown and described.

As previously discussed, the symbolic links created during the operation of block 70 have non-root permissions that allow non-root users to perform administrative operations in the virtual control module that delete or change the symbolic links, or replace them with system files that are not symbolic links. This permits non-root users to configure the virtual system administration environment by installing new software that the users might otherwise not be privileged to install.

Block 72 illustrates the operation performed by the VCM logic 6 of providing a capability to resolve the symbolic links from within the virtual control module to allow the one or more non-root users to execute the one or more system files by invoking the symbolic links of the same name. As discussed above, this operation may be performed by directly or indirectly mounting a top-level root file system directory into the virtual control module's virtual file system.

Block 74 illustrates the operation performed by the VCM logic 6 of placing one or more of the non-root users in the virtual control module by setting a root directory of the virtual file system as an apparent root directory of the one or more non-root users. As discussed above, this operation may be performed when a non-root user performs a system login or at any other appropriate time. A specific example using the Unix 'chroot' command has been described.

It is possible that new software installed in a virtual system administration environment could result in operational improvements that a system administrator might wish to apply to the system 2 as a whole. As such, it is further contemplated that the VCM logic 6 could maintain a log of software installation and update activities within each virtual control module 4. Via the user interface 8, a system administrator may periodically scan new software installation(s) or software update(s) recorded by the VCM 6 to determine if such changes should be applied on a system-wide basis.

Accordingly, a virtual system administration environment for non-root users has been disclosed. Within this environment, non-root users do not need root privileges to perform system administration tasks. Nor will the non-root users change the system environment for other users who are outside of the virtual system administration environment. All changes will be confined to the virtual environment.

It will be appreciated that the foregoing concepts may be variously embodied in any of a data processing system, a machine implemented method, and a computer program product in which digitally encoded program instructions are stored on one or more computer-readable data storage media for use in controlling a computer or other data processing apparatus to perform the required functions. The program instructions may be comprise machine language code that is ready for loading and execution by a processor within the apparatus, or the program instructions may comprise a higher level language that can be assembled, compiled or interpreted into machine language. Example high level languages include, but are not limited to assembly, C, C++, to name but a few. When implemented on an apparatus comprising a processor, the program instructions combine with the processor to provide a particular machine that operates analogously to specific logic circuits, which themselves could be used for implementing the disclosed subject matter.

Figure 6:
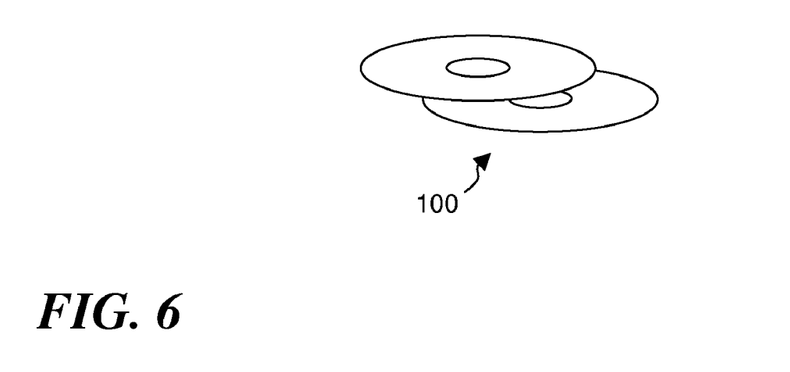
FIG. 6 is a diagrammatic illustration of example storage media that may be used to provide a computer program product for implementing a virtual system administration environment as disclosed herein.

Example data storage media for storing such program instructions are shown by reference numeral 100 in FIG. 6. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions of computer program product either alone or in conjunction with other software product that incorporates the required functionality. The media 100 could also comprise portable magnetic storage media (such as floppy disks, flash memory sticks, etc.), or magnetic storage media combined with drive systems (e.g. disk drives), or storage media incorporated in data processing platforms, such as random access memory (RAM), read-only memory (ROM) or other semiconductor or solid state memory. More broadly, the media 100 could comprise any electronic, magnetic, optical, semiconductor storage system or apparatus or device, or any other non-transitory tangible entity representing a machine, manufacture or composition of matter that can contain, store, communicate, or transport the program instructions for use by or in connection with an instruction execution system, apparatus or device, such as a computer. For all of the above forms of media, when the program instructions are loaded into and executed by an instruction execution system, apparatus or device, the resultant programmed system, apparatus or device becomes a particular machine for practicing embodiments of the subject matter disclosed herein.

Although various embodiments have been described, it should be apparent that many variations and alternative embodiments could be implemented in accordance with the inventive concepts disclosed herein. It is understood, therefore, that the invention is not to be in any way limited except in accordance with the spirit of the appended claims and their equivalents.

What is claimed is:

1. In a computing system having an instruction processor, a memory and a data storage operatively coupled together, said data storage including one or more storage media tangibly embodying a hierarchical root file system containing plural system files in one or more system directories for supporting data processing operations on behalf of users of said computing system, a method implemented by said instruction processor from program instructions stored in said memory for establishing a virtual system administration environment in which one or more of said users that are non-root users can perform system administration operations that normally require root privileges, said method comprising:

providing a virtual control module having a virtual file system that includes one or more virtual directories corresponding in name to one or more of said system directories of said root file system, each of said virtual directories containing one or more symbolic links corresponding in name and symbolically linking to one or more of said system files representing symbolic link targets;

said symbolic links having non-root permissions that allow said non-root users to perform software installations in said virtual control module that delete or change said symbolic links, or replace them with system files that are not symbolic links;

providing a capability to resolve said symbolic links from within said virtual control module to allow said non-root users to execute said one or more system files by invoking said symbolic links of the same name;

placing one or more of said non-root users in said virtual control module by setting a root directory of said virtual file system as an apparent root directory of said one or more non-root users; and maintaining a log of said software installations for use by a system administrator in considering whether to perform said software installations in said root file system, wherein said virtual control module is provided in one or more home directories associated with said one or more non-root users or in a group directory associated with said one or more non-root users.

2. The method of claim 1, wherein said one or more virtual directories include a virtual root directory, a virtual binaries directory, and a virtual libraries directory.

3. The method of claim 1, wherein said placing of said one or more non-root users in said virtual control module is performed when said one or more non-root users perform a login operation.

4. The method of claim 1, wherein said providing a capability to resolve said symbolic links from within said virtual control module comprises directly or indirectly mounting all system directories containing said symbolic link targets into said virtual file system.

5. The method of claim 1, further including maintaining a record of said symbolic links and using said record to reset said virtual control module to an initial state following one or more file operations that remove one or more of said symbolic links.

6. A system, comprising:
   an instruction processor, a data storage and a memory operatively coupled together;
   said data storage including one or more storage media tangibly embodying a hierarchical root file system containing plural system files in one or more system directories for supporting data processing operations on behalf of users of said computing system;
   said memory including a storage medium tangibly embodying a program of instructions executable by said processor to perform operations for establishing a virtual system administration environment in which one or more of said users that are non-root users can perform system administration operations that normally require root privileges, said operations comprising:
   providing a virtual control module having a virtual file system that includes one or more virtual directories corresponding in name to one or more of said system directories of said root file system, each of said virtual directories containing one or more symbolic links corresponding in name and symbolically linking to one or more of said system files representing symbolic link targets;
   said symbolic links having non-root permissions that allow said non-root users to perform software installations in said virtual control module that delete or change said symbolic links, or replace them with system files that are not symbolic links;
   providing a capability to resolve said symbolic links from within said virtual control module to allow said non-root users to execute said one or more system files by invoking said symbolic links of the same name;
   placing one or more of said non-root users in said virtual control module by setting a root directory of said virtual file system as an apparent root directory of said one or more non-root users; and
   maintaining a log of said software installations for use by a system administrator in considering whether to perform said software installations in said root file system,
   wherein said virtual control module is provided in one or more home directories associated with said one or more non-root users or in a group directory associated with said one or more non-root users.

7. The system of claim 6, wherein said one or more virtual directories include a virtual root directory, a virtual binaries directory, and a virtual libraries directory.

8. The system of claim 6, wherein said placing of said one or more non-root users in said virtual control module is performed when said one or more non-root users perform a login operation.

9. The system of claim 6, wherein said providing a capability to resolve said symbolic links from within said virtual control module comprises directly or indirectly mounting all system directories containing said symbolic link targets into said virtual file system.

10. The system of claim 6, wherein said operations further include maintaining a record of said symbolic links and using said record to reset said virtual control module to an initial state following one or more file operations that remove one or more of said symbolic links.

11. A computer program product, comprising:
   one or more computer-readable storage media:
   program instructions stored on said one or more storage media for programming a computing system having an instruction processor, a memory and a data storage operatively coupled together, said data storage including one or more storage media tangibly embodying a hierarchical root file system containing plural system files in one or more system directories for supporting data processing operations on behalf of users of said computing system, said program instructions being operative to program said processor to perform operations for establishing a virtual system administration environment in which one or more of said users that are non-root users can perform system administration operations that normally require root privileges, said operations comprising:
   providing a virtual control module having a virtual file system that includes one or more virtual directories corresponding in name to one or more of said system directories of said root file system, each of said virtual directories containing one or more symbolic links corresponding in name and symbolically linking to one or more of said system files representing symbolic link targets;
   said symbolic links having non-root permissions that allow said non-root users to perform software installations in said virtual control module that delete or change said symbolic links, or replace them with system files that are not symbolic links;
   providing a capability to resolve said symbolic links from within said virtual control module to allow said non-root users to execute said one or more system files by invoking said symbolic links of the same name;
   placing one or more of said non-root users in said virtual control module by setting a root directory of said virtual file system as an apparent root directory of said one or more non-root users; and maintaining a log of said software installations for use by a system administrator in considering whether to perform said software installations in said root file system, wherein said virtual control module is provided in one or more home directories associated with said one or more non-root users or in a group directory associated with said one or more non-root users.

12. The computer program product of claim 11, wherein said placing of said one or more non-root users in said virtual control module is performed when said one or more non-root users perform a login operation.

13. The computer program product of claim 11, wherein said providing a capability to resolve said symbolic links from within said virtual control module comprises directly or indirectly mounting all system directories containing said symbolic link targets into said virtual file system.

14. The computer program product of claim 11, wherein said operations further include maintaining a record of said symbolic links and using said record to reset said virtual control module to an initial state following one or more file operations that remove one or more of said symbolic links.

* * * * *